United States Patent [19]

Hanson et al.

[11] 4,060,721
[45] Nov. 29, 1977

[54] PHOTOFLASH LAMP ARRAY HAVING CONDUCTIVE REFLECTOR

[75] Inventors: James M. Hanson, Euclid; Gerald W. Povall, Highland Heights, both of Ohio

[73] Assignee: General Electric Company, Schenectady, N.Y.

[21] Appl. No.: 655,055

[22] Filed: Feb. 4, 1976

[51] Int. Cl.² .............................................. G03B 15/02
[52] U.S. Cl. ...................................... 362/13; 362/346
[58] Field of Search ............. 240/1.3, 103 R; 431/93, 431/95 R, 95 A

[56] References Cited

U.S. PATENT DOCUMENTS

| | | | |
|---|---|---|---|
| 3,714,407 | 1/1973 | Bowers | 240/1.3 |
| 3,724,346 | 4/1973 | Armstrong | 240/103 R X |
| 3,894,226 | 7/1975 | Hanson | 240/1.3 |
| 3,935,442 | 1/1976 | Hanson | 240/1.3 |

Primary Examiner—Fred L. Braun
Attorney, Agent, or Firm—Norman C. Fulmer; Lawrence R. Kempton; Frank L. Neuhauser

[57] ABSTRACT

A photoflash lamp array comprising a plurality of flash lamps having lead-in wires connected to a circuit board, and a reflector unit positioned between the lamps and the circuit board. The reflector unit is made of plastic provided with an electrically conductive reflecting coating on its front surface, and is further provided with an integral tab member having a surface exposed to the front of the reflector unit, which surface is coated with said conductive coating, the tab being bent over so that its coated surface faces the circuit board and is in contact with an electrical ground area of the circuit board, whereby the conductive coating of the reflector unit is connected to electrical ground and functions to dissipate electrostatic charges thus preventing accidental flashing of lamps.

9 Claims, 8 Drawing Figures

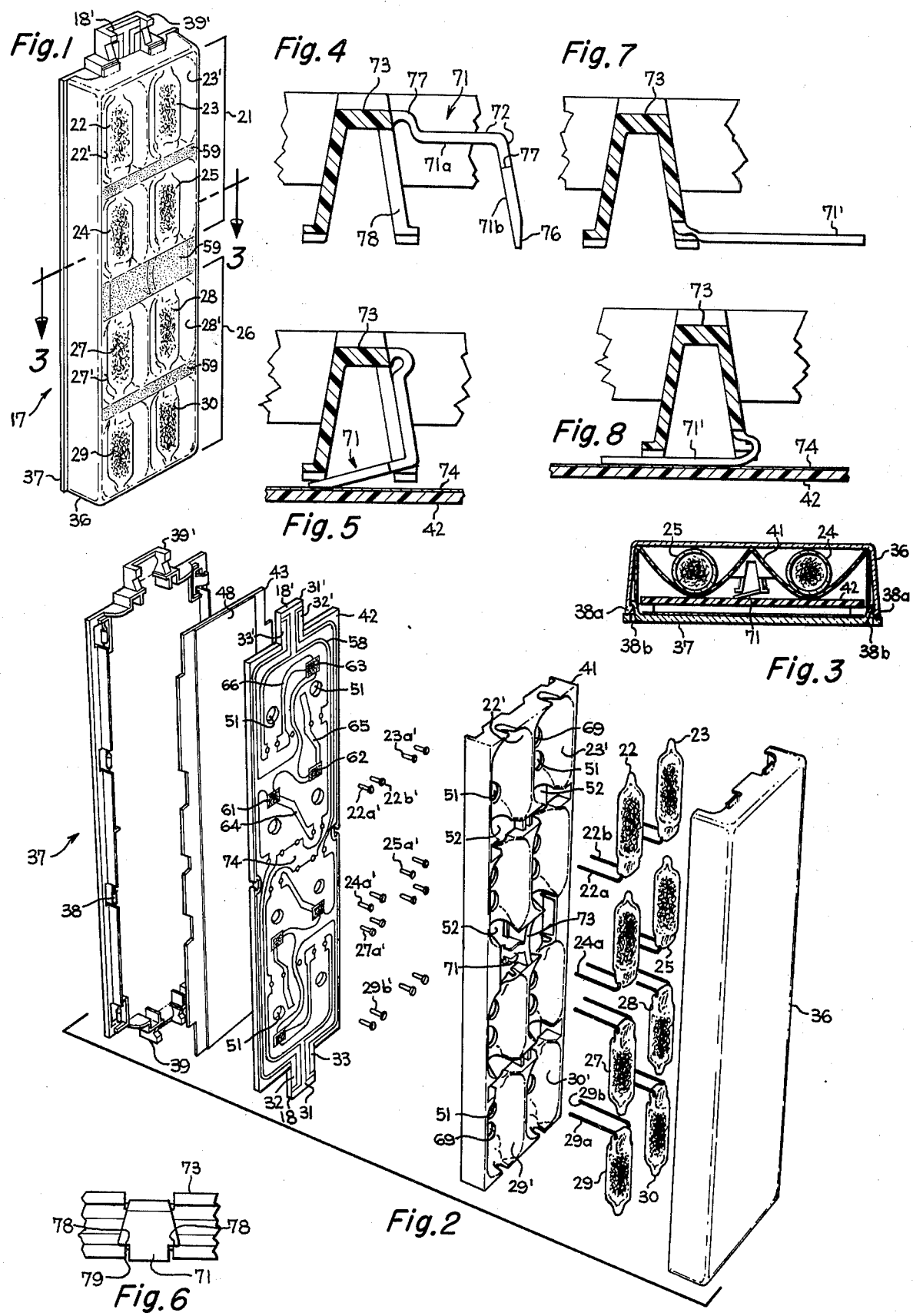

PHOTOFLASH LAMP ARRAY HAVING CONDUCTIVE REFLECTOR

CROSS-REFERENCES TO RELATED APPLICATIONS

Ser. No. 485,422, filed July 3, 1974, Paul T. Cote, "Multiple Flash Lamp Unit," now U.S. Pat. No. 3,980,875 and assigned the same as this invention.

Ser. No. 485,460, filed July 3, 1974, Paul T. Cote, "Protective Terminal for Multiple Flash Lamp Unit," now U.S. Pat. No. 3,980,876 and assigned the same as this invention.

Ser. No. 509,410, filed Sept. 26, 1974, James M. Hanson, "Photoflash Lamp Array Having Electrically Connected Reflector," now U.S. Pat. No. 3,935,442 and assigned the same as this invention.

Ser. No. 655,005, filed Feb. 4, 1976, James M. Hanson, Stanley S. Palagyi, and Gerald W. Povall, "Photoflash Lamp Array Having Conductive Reflector," assigned the same as this invention.

BACKGROUND OF THE INVENTION

The invention is in the field of multiple photoflash lamp units, such as planar arrays.

The above-referenced patent applications disclose multiple flash lamp arrays comprising a plurality of flash lamps having their lead-in wires connected to a circuit board provided with switching circuitry for causing sequential flashing of the lamps, and reflectors are positioned between the lamps and the circuit board. As is particularly disclosed in the above-referenced Cote patent applications, the reflectors for the lamps can be made as a single reflector member or unit shaped to provide multiple individual reflectors for the lamps. This reflector member preferably is electrically conductive, such as by being made of metal or metal-coated plastic, and is electrically connected to an electrical "ground" portion of the circuitry on the circuit board. Thus, the reflector member functions as an electrical shield and also increases the stray capacitance to earth ground (or space) of the electrical "ground" of the circuitry, for dissipating electrostatic charges and thus reducing the possibility of accidental flashing of lamps by electrostatic voltage charge on a person or object touching the array, which accidental flashing is particularly prone to occur if the lamps are high voltage types requiring a firing voltage of 1000 or 2000 volts, for example, at low energy. To help achieve the foregoing, the flash array connector is arranged so that an electrical ground terminal thereon is more readily touchable by persons or objects than are other terminals on the connector.

The above-referenced Hanson patent application discloses an arrangement for electrically connecting the conductive reflector to a conductive area on the circuit board, comprising a U-shaped conductive clip member clipped to a web of the reflector unit and extending against the conductive area on the circuit board.

SUMMARY OF THE INVENTION

Objects of the invention are to provide an improved flash array construction and to provide an improved electrical connection between a reflector member and a circuit board, which is feasible and economical to manufacture.

The invention comprises, briefly and in a preferred embodiment, a multiple flash lamp array containing a plurality of flash lamps having lead-in wires connected to a circuit board carrying circuitry for flashing the lamps. An electrically conductive reflector unit is positioned between the lamps and the circuit board. The reflector unit comprises a shaped plastic member having electrically conductive reflecting material on its front surface facing the lamps, the shaped plastic member being provided with an integral tab member having a surface exposed to the front of the reflector unit, which surface is provided with said electrically conductive material thereon, and the tab is bent over so that its conductive surface faces the circuit board and is in contact with an electrical ground area of the circuit board, whereby the conductive material of the reflector unit is connected to said electrical ground and functions to dissipate electrostatic charges thus preventing accidental flashing of lamps.

In one embodiment, the front exposed surface of the tab initially faces directly frontwardly, and, after being conductively coated, the tab is bent backward substantially 180° so that its conductive surface faces rearwardly and against the circuit board. In another embodiment, the frontwardly exposed surface of the tab has a first area joined to the rest of the reflector unit and facing frontwardly, the tab having a bend toward the rear to provide a second frontwardly exposed area facing somewhat laterally with respect to the reflector optical axis, and, after the frontwardly exposed first and second areas of the tab are conductively coated, the tab is bent backward substantially 90° at its junction with the rest of the reflector unit so that its second coated area faces rearwardly of the reflector unit and can make contact with a conductive area on the circuit board. The aforesaid tabs can conveniently be formed integrally with a web region at the center of the reflector unit.

BRIEF DESCRIPTION OF THE DRAWING

FIG. 1 is a perspective view of a multiple flash lamp array utilizing the invention.

FIG. 2 is an exploded view of the array of FIG. 1 showing the internal parts.

FIG. 3 is a sectional view taken on the line 3—3 of FIG. 1.

FIGS. 4, 5, and 6 show details of an embodiment of the invention.

FIGS. 7 and 8 show details of another embodiment of the invention.

DESCRIPTION OF THE PREFERRED EMBODIMENTS

A multiple flashlamp unit 17 of the planar array type and containing a plurality of electrically fired flash lamps is provided with a plug-in connector tab 18 at the lower end thereof, adapted to fit into a socket of a camera or flash adapter as shown and described in the above-referenced patent applications. The lamp array 17 is provided with a second plug-in connector tab 18' at the top end thereof, whereby the array 17 is adapted to be attached to the camera socket in either of two orientations, i.e., with either the tab 18 or the tab 18' plugged into the socket. The array 17 is provided with an upper group 21 of flash lamps 22, 23, 24, and 25, and a lower group 26 of flash lamps 27, 28, 29, and 30, the lamps being arranged in a planar configuration. Reflectors 22', etc., are disposed behind the respective flash lamps, so that as each lamp is flashed, its light is projected forwardly of the array 17. The lamps are arranged and connected so that when the array is connected to a camera by the connector 18, only the upper group 21 of lamps will be flashed, and when the array is turned end for end and connected to the camera by the other connector 18', only the then upper group 26 of lamps will be flashed. By this arrangement, only lamps relatively far from the lens axis are flashable, thus reducing the undesirable red-eye effect, as is more fully described in the above-referenced patent applications.

The general construction of the array, also disclosed in the above-referenced Hanson application, comprises front and back housing members 36 and 37, which preferably are made of plastic and are provided with interlocking members 38 which can be molded integrally with the housing members and which lock the housing members together in final assembly to form a unitary flash array structure. FIG. 3 shows a pair of interlocking members 38a carried at the rear of the side of the front housing member 36 interlocked with a pair of interlocking members 38b of the back housing member 37. In the preferred embodiment shown, the front housing member 36 is a rectangular concavity and the back housing member 37 is substantially flat and includes integral extensions 39 and 39' at the ends thereof which partly surround and protect the connector tabs 18 and 18' and also function to facilitate mechanical attachment to the camera socket. Sandwiched between the front and back housing members 36 and 37, in the order named, are the flash lamps 22, etc., a unitary reflector member 41 (preferably of plastic coated with aluminum on its front surface) shaped to provide the individual reflectors 22', etc., a printed circuit board 42 provided with integral connector tabs 18 and 18', and an indicia sheet 43 which may be provided with instructions, information, trademarks, and other indicia such as flash indicators located behind the respective lamps and which change color due to heat and/or light radiation from a flashing lamp, thus indicating at a glance which of the lamps have been flashed and not flashed.

The indicia sheet 43 may be of paper or thin cardboard and provided with openings where the flash indicators are desired, and flash indicator material, such as a sheet-like heat-sensitive plastic material, for example biaxially oriented polypropylene, which shrinks or melts when subjected to heat or radiant energy from an adjacent flashing lamp thus effectively changing the color of the openings in the indicia sheet 43. For example, the plastic material can be colored green on its back side by ink or other suitable means, and the green disappears and the opening becomes a different color (dark, for example) when the plastic shrinks or melts away due to heat from an adjacent flashing lamp. The front of the plastic (toward the lamps) should be coated with dark ink so as to absorb heat more readily. A single flash indicator sheet 48 may be arranged over all of the flash indicator openings, as is described in the above-referenced Hanson patent application. Openings 51 are provided through the reflector unit 41 and the circuit board 42 to facilitate radiation from flashing lamps reaching the flash indicators 47. The rear housing member 37 is transparent (either of clear material or provided with window openings) to permit viewing of the indicia on the indicia sheet 43. The front housing member 36 is transparent at least in front of the lamps 22, etc., to permit light from flashing lamps to emerge frontwardly of the array, and may be tinted to alter the color of light from the flash lamps.

The height and width of the rectangular array are substantially greater than its thickness, and the heights and widths of the reflector member 41 and circuit board 42 are substantially the same as the interior height and width of the housing member 36, to facilitate holding the parts in place.

The tab 18, which is integral with the circuit board 42, is provided with a pair of electrical terminals 31 and 32, and similarly the tab 18' is provided with a pair of terminals 31' and 32', for contacting terminals of a camera socket for applying firing voltage pulses to the array. Each tab is provided with a third terminal 33 and 33', respectively, which functions to electrically short the circuitry of the inactive lower group of lamps when the array is plugged into a socket. The terminals 31 and 31' are shown as having a lateral "T-bar" configuration for temporarily shorting the socket terminals while the array is being plugged in, to discharge any residual voltage charge in the firing pulse source, and also to reduce the likelihood of lamps being accidentally flashed by electrostatic voltage when the array is handled, as is disclosed in the above-referenced Cote patent application Ser. No. 485,460, now U.S. Pat. No. 3,980,876, because these terminals, which are connected to electrical ground in the circuit, are more readily touchable than the other electrically "hot" terminals.

The circuit board 42 has a "printed circuit" thereon, as will be described, for causing sequential flashing of the lamps by firing voltage pulses applied to the terminals 31, 32 or 31', 32'. The top and bottom halves of the printed circuitry preferably are reverse mirror images of each other. The lead wires 22a, 22b, etc., of the lamps 22, etc., may be attached to the circuit board 42 in various ways, such as by means of metal eyelets 22a', 22b', etc., placed through openings in the board. The lead wires 22a, 22b, etc., pass through openings 52 in the reflector member 41 and into or through the respective pairs of eyelets 22a', 22b', etc., and the ends of the eyelets are crimped or bent to hold the lead wires and make electrical contact thereto and also to hold the eyelets in place with their heads in electrical contact with the circuit of the circuit board.

Areas 59 on the transparent front housing member 36 may be made opaque or partly opaque, such as by making the surface roughened at these areas, to fully or partly conceal the lamp lead-in wires 22a, 22b, etc., and/or the lower portions of the lamps, for improved appearance of the array.

The circuit board terminal 32 is part of a conductor run that is electrically connected to lead-in wire 24a of lamp 24 at the eyelet 24a' and terminates at radiation switches 61, 62, and 63 respectively positioned near lamps 24, 25, and 23. A circuit board conductor run 64 is connected electrically to the remaining lead wire of flash lamp 25 at eyelet 25a' and terminates at the radiation switch 61. A circuit board conductor run 65 is connected to the remaining lead-in wire of flash lamp 23 at eyelet 23a' and terminates at the radiation switch 62. Similarly, a circuit board conductor run 66 is connected to the remaining lead-in wire of flash lamp 22 at eyelet 22b' and terminates at radiation switch 63.

The radiation switches 61, 62, and 63 are respectively in contact with and bridge across the circuit runs that are connected to them. The material for the radiation switches may be suitable material initially having an open circuit or high resistance, the resistance thereof becoming zero or a low value when the material receives radiation in the form of heat and/or light from a respective adjacent lamp, upon the lamp being flashed. For this purpose, each of the radiation switches is respectively positioned behind and near to a flash lamp 24, 25, 23. Windows in the form of transparent sections or openings 69 may be provided in the reflectors in front of the switches as shown in FIG. 2 to facilitate radiation transfer. A suitable material for the radiation switches is silver oxide dispersed in a binder such as polyvinyl resin. Each of these radiation switches, upon receiving heat and/or light radiation from the adjacent lamp when it is flashed, changes from an open circuit or high resistance to a closed circuit or low resistance between its switch terminals on the circuit board.

As has been explained, the lower portion of the circuit board contains a substantially reverse mirror image of the same circuit shown in the upper part of the circuit board, and therefore will not be described in detail. It will be noted that the circuit runs from the plugged-in terminals 31 and 32 at the lower part of the circuit board extend upwardly so as to activate the circuitry in the upper half of the circuit board. Similarly, when the unit is turned around the tab 18' is plugged into a socket, the circuit board terminals 31' and 32' will be connected to and activate the lamps which then will be in the upper half of the circuit board, and hence in the upper half of the flash unit 17. This accomplishes, as has been stated, the desirable characteristic whereby only the group of lamps relatively farthest away from the lens axis will be flashed, thereby reducing or eliminating the undesirable red-eye effect.

The circuit on the circuit board 42 functions as follows. Assuming that none of the four lamps in the upper half of the unit 17 have been flashed, upon occurrence of a first firing pulse applied across the terminals 31, 32, this pulse will be directly applied to the lead-in wires of the first-connected flash lamp 24, whereupon the lamp 24 flashes and becomes an open circuit between its lead-in wires. Heat and/or light radiation from the flashing first lamp 24 causes the adjacent radiation switch 61 to become a closed circuit (or a low value of resistance), thereby connecting the circuit board terminal 32 electrically to the lead-in wire of the second lamp 25 at eyelet 25a'. By the time this occurs, the firing pulse has diminished to a value insufficient to cause the second lamp 25 to flash. When the next firing pulse occurs, it is applied to the lead-in wires of the second lamp 25, via the now closed radiation switch 61, whereupon the second lamp 25 flashes, thereby causing radiation switch 62 to assume zero or low resistance, and the second lamp 25 now has an open circuit or high resistance between its lead-in wires. When the next firing pulse occurs, it is applied via now closed radiation switch 62 to the third lamp 23, thereby firing the lamp which becomes an open circuit, and the radiation from it causes the radiation switch 63 to become essentially a closed circuit across its terminals. Thus, the next firing pulse will be applied, via now closed radiation switch 63, to the lead-in wires of the fourth flash lamp 22, thereupon causing the lamps to flash. Since this lamp is the last lamp in the active circuit, it does not matter whether its lead-in wires are an open or closed circuit after flashing, and a radiation switch does not need to be provided adjacent to it.

Additional flash lamps, radiation switches, and electrical conductors can be employed, if desired, using the just described principles. When the flash unit is turned around the other connector tab 18' attached to the camera socket, the group of lamps that then become uppermost and relatively farthest away from the lens axis will be in an active circuit and will be flashed in the same manner as has been described. In a preferred embodiment, the lamps 22, etc., are high voltage types, requiring about 2000 volts for example, at low current, for flashing, and they can be fired by impacting or stressing a piezoelectric element in the camera, as disclosed in U.S. Pat. Nos. 2,972,937 and 3,106,080 to C. G. Suits.

As is disclosed in the above-referenced Cote patent applications, it is desirable to electrically connect the conductive reflector unit 41 to the more readily touchable electrical ground terminals 31 and 31' of the array, so that when these terminals are touched by an electrostatically charged person or object, the reflector unit functions as a shield (connected to the terminals 31 and 31') having relatively large stray capacitance to ground, whereby a relatively large amount of the electrostatic voltage will be dissipated to ground (or into space) rather than flowing through the primers or other flash ignition means of the lamp 22, etc. A feasible and economical way of manufacturing the reflector unit 41 is to mold or otherwise shape a plastic material in the desired configuration having a plurality of individually shaped reflector surfaces, and apply a metal coating, such as vapor-deposited aluminum, to the front surface of the reflector unit. A metal coating is unnecessary and undesirable on the rear surface of the reflector unit. The above-referenced Hanson patent application discloses a way of electrically connecting the metal coating on the front of the reflector unit to an electrical ground area of the circuit board, by means of a U-shaped metal clip.

In accordance with the present invention, the conductive front surface of the reflector unit is electrically connected to one or more circuit areas of the circuit board, such as electrical ground areas, by providing the plastic reflector unit with an integral tab having a surface facing sufficiently frontwardly so as to be coated with metal along with the front of the reflector, and the tab is then bent backwardly so that its metal-coated surface faces rearwardly and against an electrical ground area of the circuit board 42. Thus, the array is provided with a resilient tab integral with and at the rear of the reflector unit and pressing against an electrical ground area of the circuit board, the rear surface of the tab having a metal coating that is integral with the metal coating on the front surface of the reflector unit so as to electrically connect the metal coating of the reflector to electrical ground of the circuit board, so that the reflector unit can function as a shield member for dissipating electrostatic charges.

In the embodiment shown in FIGS. 2-6, a tab 71 is formed integrally with the reflector unit 41 and extends from a web 73 of the reflector unit located between the lead-in wire openings 52 for the flash lamps 24, 25, 27, and 28 near the center of the reflector unit. The tab 71 has a first portion 71a extending substantially sideways from the web 73 at the front surface thereof, and a second portion 71b extending somewhat rearwardly from the first portion 71a. However, the tab portion 71b can lie in the same plane as portion 71a, if desired. The frontwardly exposed surface 72 of the tab 71 (on both portions 71a and 71b) and the entire front of the reflector unit are coated with a metal, such as aluminum, by suitable means such as vapor deposition. The metal coating functions both as a light-reflecting surface and as an electrical shield for dissipating electrostatic charges. The tab 71 is then bent to bring the portion 71b behind the web 73, with its metal-coated surface facing rearwardly and against an electrical ground area 74 at the center of the circuit board 42 in the final assembly of the array. The free end of the coated side of the tab can be beveled as indicated at 76 to facilitate contact between the tab and the electrical ground area. The tab 71 can be thinned or notched to provide a hinge 77 near the web 73, to facilitate its bending. If the thin metal coating on the tab 71 should crack or separate when bent, electrostatic charges will readily arc over any such discontinuities. The free end region of the tab 71 can be provided with outwardly extending shoulders 78 for locking the tab in a slot 79 in the web 73, so as to be in position for final assembly of the array.

In the embodiment shown in FIGS. 7 and 8, the tab 71' is flat and extends sideways from the web 73, near the rear thereof. After the reflector unit and the frontwardly exposed surface of the tab 71' have been metallized as described above, the tab is bent back approximately 180° so that its metal-coated surface will contact the electrical ground area 74 on the circuit board 42, thus connecting the reflector unit's metal reflective coating to electrical ground in the completed array.

The resiliency of the tab 71 (and 71') assures a reliable electrical connection of the reflector's conductive coating to electrical ground of the array, and this is achieved with an economical manufacturing method.

While preferred embodiments and modifications of the invention have been shown and described, various other embodiments and modifications thereof will become apparent to persons skilled in the art and will fall within the scope of the invention as defined in the following claims.

What we claim as new and desire to secure by Letters Patent of the United States is:

1. A multiple flash lamp array comprising a plurality of electrically fired flash lamps each having a pair of lead-in conductors, a circuit board containing thereon circuitry for sequentially firing said flash lamps, means electrically connecting said lead-in conductors of the flash lamps to said circuitry, a reflector unit positioned between said lamps and said circuit board and shaped to define individual concave reflectors on the front thereof for reflecting light from said lamps frontwardly of the array when flashed, said reflector unit comprising electrically insulating material having a coating of electrically conductive material on the front surface thereof, and an electrical ground conductive area carried on the front of said circuit board, wherein the improvement comprises a tab integral with said reflector unit and resiliently engaging against said electrical ground conductive area, said conductive coating on the reflector unit extending to the back of said tab thereby providing an electrical connection between said electrical ground conductive area and said conductive coating on the front of the reflector unit.

2. An array as claimed in claim 1, in which said array is provided with a group of connector terminals positioned and arranged so that one of said connector terminals is more readily touched than the other terminals when the array is handled, and means electrically connecting said more readily touched connector terminal to said conductive area on the circuit board.

3. An array as claimed in claim 2, in which said conductive area on the circuit board is electrically connected to a lead-in wire of each of said flash lamps.

4. An array as claimed in claim 1, in which said reflector unit is provided with an integral web region adjacent to and in front of said electrical ground conductive area of the circuit board, said tab extending sideways from said web region and being bent so that a portion thereof lies behind said web region and against said electrical ground conductive area.

5. An array as claimed in claim 4, in which said tab and web region are provided with interlocking slot and shoulder means.

6. A method of making a flash lamp array having a reflector unit electrically connected to an electrical ground area of a circuit board, comprising the steps of shaping said reflector unit from electrically insulating material to provide individual concave reflectors facing frontwardly thereof, providing a coating of electrically conductive material on the front surface of said reflector unit, providing a tab integral with said reflector unit and having a surface thereof exposed sufficiently toward the front of said reflector unit so as to become coated with said conductive material during said step of coating the front of the reflector unit, bending said tab backwardly so that its coated surface faces rearwardly, and positioning said reflector unit over said circuit board so that said coating on the tab engages against said electrical ground area.

7. A method as claimed in claim 6, including the steps of providing a pair of openings through said reflector unit which define a web region therebetween, shaping said tab to initially extend sideways from said web region near the rear thereof, and after said coating step, bending said tab backward substantially 180° so that the conductive coating thereon faces rearwardly behind said web region.

8. A method as claimed in claim 6, including the steps of providing a pair of openings through said reflector unit which define a web region therebetween, shaping said tab to initially have a first portion extending sideways from said web region at a point spaced from the rear thereof and a second portion extending rearwardly in the reflector unit, the outer surfaces of said first and second tab portions being sufficiently exposed toward the front of the reflector unit so as to become coated during said coating step, and bending said tab backward to position said second portion thereof substantially behind said web region so that the conductive coating thereon faces rearwardly.

9. A method as claimed in claim 8, including the step of providing said tab and web region with interlocking slot and shoulder means for holding said tab in position after said bending step.

* * * * *